March 21, 1939.  H. T. PLATZ  2,151,563
AUTOMATIC VALVE FOR WELDING MACHINES
Filed Dec. 9, 1935   2 Sheets-Sheet 1
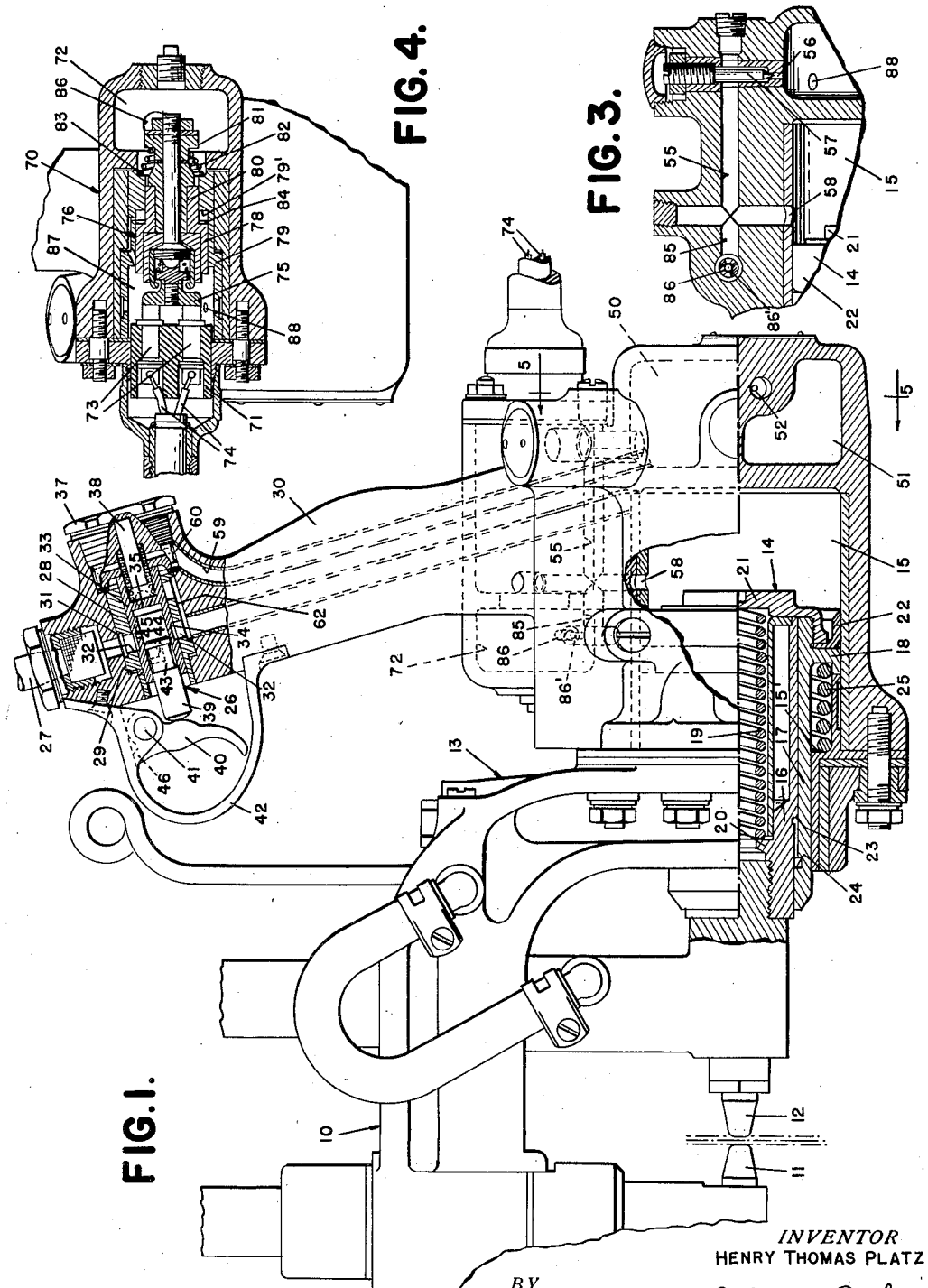
INVENTOR
HENRY THOMAS PLATZ
BY
ATTORNEYS March 21, 1939.  H. T. PLATZ  2,151,563
AUTOMATIC VALVE FOR WELDING MACHINES
Filed Dec. 9, 1935  2 Sheets-Sheet 2
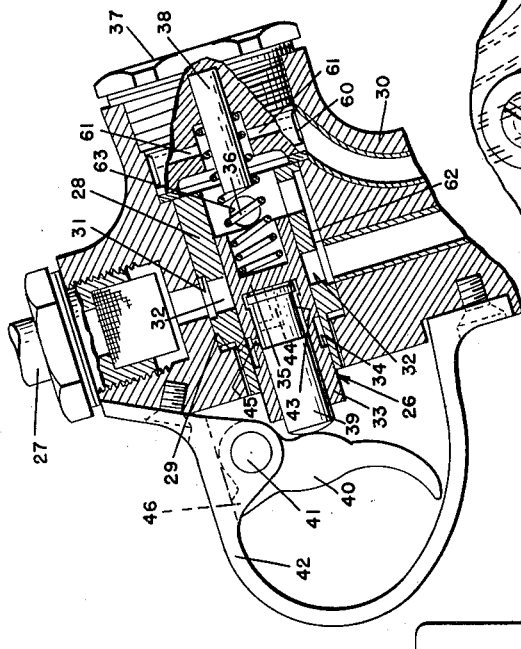
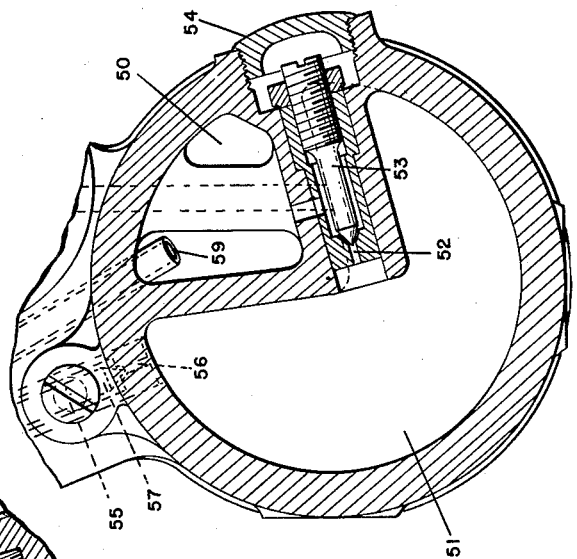
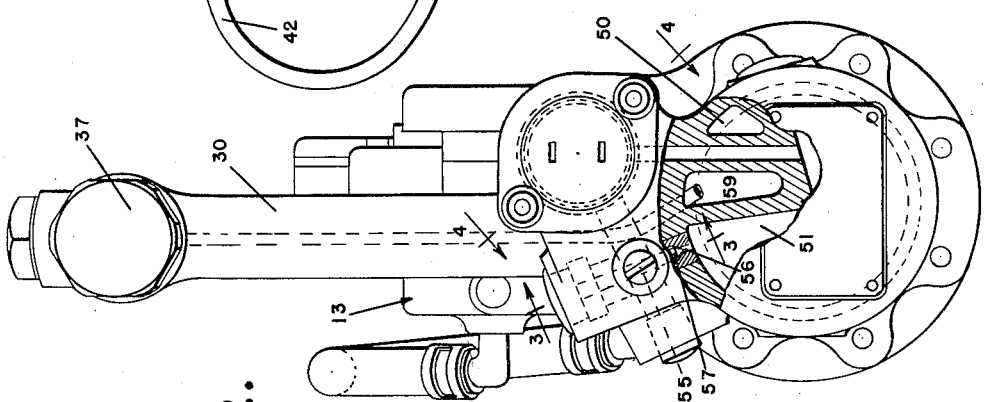
INVENTOR
HENRY THOMAS PLATZ
BY
Whittemore Hulbert Whittemore & Belknap
ATTORNEYS Patented Mar. 21, 1939

2,151,563

UNITED STATES PATENT OFFICE 2,151,563

AUTOMATIC VALVE FOR WELDING MACHINES

Henry Thomas Platz, Detroit, Mich., assignor to Briggs Manufacturing Company, Detroit, Mich., a corporation of Michigan Application December 9, 1935, Serial No. 53,629

8 Claims. (Cl. 219—4)

This invention relates generally to welding apparatus and refers more particularly to improvements in the control mechanism for such apparatus.

The present invention contemplates simplifying, rendering more efficient and improving generally, the operation of electric welding apparatus by providing a control system rendering it possible to maintain the electrodes in clamping relation with the work after the welding circuit is open so that, in effect, the work is actually forged upon completion of the welding operation.

One of the principal objects of this invention consists in the provision of welding apparatus having relatively movable electrodes and having a control system embodying; first, means operable to effect relative movement of the electrodes into engagement with the work and to subsequently automatically effect relative movement of the electrodes out of engagement with the work; second, means for automatically closing an electric circuit to the electrodes after the latter have been relatively moved into engagement with the work and for automatically opening the circuit upon completion of the welding operation; third, means for regulating the interval of time between closing and opening the circuit to vary the duration of the welding operation and fourth, means for independently varying the interval of operation of the electrode actuating means to relatively move the electrodes out of engagement with the work.

The foregoing as well as other objects will be made more apparent as this description proceeds, especially when considered in connection with the accompanying drawings wherein, Figure 1 is a side elevational view of a welding device constructed in accordance with this invention and having certain parts broken away for the sake of clearness;

Figure 2 is an end elevation of the construction shown in Figure 1, also having certain parts broken away for the sake of clearness;

Figure 3 is a fragmentary sectional view taken substantially on the plane indicated by the line 3—3 of Figure 2;

Figure 4 is a sectional view taken substantially on the plane indicated by the line 4—4 of Figure 2;

Figure 5 is a sectional view taken substantially on the plane indicated by the line 5—5 of Figure 1; and Figure 6 is an enlarged sectional view of the control valve illustrated in Figure 1 and showing the control valve in a different position.

Referring now to the drawings, it will be noted that there is illustrated in Figure 1, a welding device 10 comprising a pair of co-operating opposed relatively movable electrodes 11 and 12 supported in axial alignment with each other on the frame 13 of the welding device in any suitable manner. Both electrodes are connected to an electric welding circuit in accordance with conventional practice and in the present instance, the electrode 11 is fixedly supported upon the frame, while the electrode 12 is supported on the frame for movement toward and away from the electrode 11.

In detail, the electrode 12 is detachably secured to a piston assembly 14 reciprocably mounted within a cylinder 15 and comprising an inner sleeve 16 having the outer end projecting beyond the cylinder for connection to the electrode 12. The inner sleeve telescopically engages an outer sleeve 17 provided with an annular enlargement 18 at the inner end adapted to slidably engage the side walls of the cylinder 15. Located within the inner sleeve 16 is a coil spring 19 having the outer end engaging a fixed abutment 20 on the sleeve 16 and having the inner end abutting a suitable cap 21 threadedly secured to the inner extremity of the sleeve 17. In this connection it is to be noted that the cap 21 forms a closure for the inner ends of both sleeves and in addition, co-operates with the enlargement 18 on the outer sleeve 17 to secure the cup-shaped sealing ring 22 in place.

The spring 19 normally tends to slide the inner sleeve relative to the outer sleeve in a direction to move the electrode 12 toward electrode 11 and, in the present instance, the extent of relative movement of the two sleeves is restricted by means of co-operating engaging shoulders 23 and 24 respectively on the inner sleeve 16 and the outer sleeve 17. The foregoing construction offers the possibility of interposing work of various thicknesses between the electrodes without adjusting or otherwise interfering with the apparatus.

As shown particularly in Figure 1, a second spring 25 is provided for moving the electrode 12 in a direction away from the co-operating electrode 11. The spring 25 surrounds the outer sleeve 17 with the inner end engaging the abutment 18 and with the outer end engaging an abutment 15' fixed to the corresponding end of the cylinder 15. It will, of course, be understood that the spring 25 is of greater strength than the spring 19 and operates in dependence upon releasing the pressure of the fluid acting on the cap 21 to initially move the sleeve 17 inwardly relative to the sleeve 16, the distance required to engage the shoulder 24 on the former with the shoulder 23 on the latter, whereupon, continued inward movement of the sleeve 17 by the spring 25 causes a corresponding movement of the inner sleeve 16 and associated electrode.

Movement of the outer sleeve 17 in a direction to engage the electrode 12 with the work is effected herein by admitting fluid pressure into the cylinder 15 in rear of the cap 21, or piston assembly 14. In accordance with this invention, the flow of fluid under pressure into the cylinder 15 is controlled by a valve assembly 26. The valve assembly 26 is manually operated to admit fluid under pressure to the cylinder 15 for relatively moving the electrodes into clamping engagement with the work and is operated automatically to relieve the clamping action on the work after a predetermined interval of time elapses. Upon reference to Figure 1, it will be noted that the valve assembly 26 is disposed in the fluid supply line 27 and comprises a sleeve or cylinder 28 fixed within a recess 29 extending transversely through the handle portion 30 of the frame 13. An arcuate groove 31 is formed in the exterior surface of the cylinder 28 in registration with the fluid intake passage 27 and circumferentially spaced radially extending openings 32 are formed in the cylinder establishing communication between the groove 31 and the interior of the cylinder. Reciprocally mounted within the cylinder 28 is a piston or plunger 33 having an annular groove 34 in the exterior surface registerable with the openings 32 in the cylinder in the rearwardmost position of the piston in the cylinder. The above arrangement is such that when the piston is in its rearwardmost position shown in Figure 1, communication is established from the source of fluid supply through the inlet passage 27 to the cylinder 15.

It will be observed from Figure 1 that the piston 33 is provided with co-extensive recessed portions separated by a partition 35 positioned intermediate the ends of the piston. The recess in the rear end of the piston 33 partially houses a spring 36 acting on the partition 35 to normally urge the piston in a forward direction, or to a position in the cylinder wherein communication through the inlet passage 27 is closed thereby. In detail, the forward end of the spring 36 engages the rear face of the partition 35, and the rear end of the spring abuts a cap 37 threadedly mounted in the rear end of the recess 29. The cap 37 serves to close the rear end of the recess 29 and carries a pin 38 adapted to extend into the coiled spring to prevent distortion of the latter.

Movement of the piston 33 in a rearward direction against the action of the spring 36 is effected by means of a trigger pin 39 slidably mounted within the recess in the forward end of the piston and adapted to be actuated by a trigger 40 pivotally supported as at 41 in the trigger guard 42. It will be noted from Figure 1 that an annular groove 43 is formed in the exterior surface of the trigger pin 39 adjacent the rear end of the latter and also that this groove communicates with the recess in the forward end of the piston at the rear side of the trigger pin through the medium of a passage 44.

Assuming that the several parts of the valve assembly 26 are in the positions thereof shown in Figure 6, wherein the inlet passage 27 is closed thereby, and that it is desired to open the latter passage, the operator merely swings the trigger 40 rearwardly about its pivotal connection 41. The aforesaid movement of the trigger 40 transmits a corresponding movement of the trigger pin 39 and, since the rear end of the latter abuts the front side of the partition 35 of the piston 33, it necessarily follows that the latter will also be moved rearwardly. When both the piston 33 and trigger pin 39 are in their rearwardmost positions with respect to the cylinder 28, fluid is not only permitted to flow from the source of supply through the valve assembly, but is also permitted to flow into the recess in the front side of the piston 33 behind the trigger pin 39, so as to return the latter to its initial outermost position. In this connection, attention is directed to the fact that fluid flowing through the openings 32 in the cylinder 28 to the annular recess 34 in the piston 33 is discharged through a restricted aperture 45 in the piston to the annular recess 43 in the trigger pin 39. The fluid admitted to the annular recess 43 in the trigger pin 39 is directed against the front side of the partition 35 by the passage 44 and the resultant pressure is sufficient to return the trigger pin 39 to its initial outermost position. The extent of forward movement of the trigger pin 39 is limited by a stop, or lug 46 formed on the trigger and engageable with a part of the guard 42.

As previously stated, the fluid admitted through the valve assembly 26 is discharged into the cylinder 15 and acts upon the cap 21 to assist the spring 19 in moving the electrode 12 toward the electrode 11 against the action of the spring 25. The fluid under pressure admitted to the cylinder 15 is not only built-up in the portion of the latter at the rear side of the cap 21 but, in addition, is admitted to the valve control chamber 50 through an accumulating chamber 51. In the present instance, the valve control chamber 50 is housed within the accumulating chamber 51 and communicates with the latter through the medium of a valve control passage 52. The flow of fluid from the accumulating chamber 51 through the passage 52 is regulated by an adjustable needle valve 53 threadedly mounted in the device and capable of being readily adjusted from a point exteriorly of the device. One specific type of needle valve construction is shown in Figure 5 for the purpose of illustration and, as will be observed from this figure, the needle valve assembly is normally concealed within the device by means of a removable cap 54. The feature of concealing the needle valve assembly is an advantageous one, since it prevents accidental displacement of the needle valve from the particular setting desired.

The flow of fluid under pressure into the accumulating chamber 51 is actually controlled by the movement of the piston assembly 14 and, in the present instance, fluid is not permitted to flow in the accumulating chamber 51 until the piston assembly 14 approaches a position wherein the electrode 12 engages the work to be welded. In detail, communication is established between the cylinder 15 and accumulating chamber 51 through the medium of a passage 55 having one end communicating with the interior of the accumulating chamber 51 through the medium of a restricted valve controlled port 56. As is shown in Figure 3, the flow of fluid through the port 56 into the accumulating chamber 51 is accurately controlled by means of a needle valve 57, identical in construction to the needle valve 53 employed to regulate the flow of fluid from the accumulating chamber to the valve control chamber 50. The passage 55 also communicates with the interior of the cylinder 15 through the medium of a port 58 controlled by the piston assembly 14. The port 58 is so located that in the normal or initial starting position of the piston assembly 14, communication between the cylinder 15 and passage 55 is closed by the piston assembly 14 and remains closed until the latter approaches a position wherein the electrode 12 engages the work to be welded. However, as soon as the port 58 is uncovered by the piston assembly, fluid under pressure will flow from the cylinder 15 through the passage 55 into the accumulating chamber 51. From the accumulating chamber 51, the fluid flows into the valve control chamber 50 in an amount determined by the measuring valve 53.

Upon reference to Figure 1, it will be noted that the valve control chamber 50 communicates with the rear end of the recess 29 through the medium of a passage 59. Referring now to Figure 6, it will be noted that the discharge end of the passage 59 communicates with an annular groove 60 in the portion of the cap 37 threaded into the rear end of the recess 29, and the annular groove in turn communicates with the recess in the rear end of the piston 33 through the medium of a plurality of radially extending passages 61. Thus, it will be apparent that the pressure of the fluid built-up in the chamber 50 supplements the action of the spring 36 on the rear face of the partition 35 in the piston 33 tending to move the latter forwardly against the action of the fluid pressure at the front side of the partition 35, to a position wherein communication through the passage 27 is closed by the piston 33. In other words, as soon as the combined force, exerted upon the rear side of the partition 35 in the piston 33 by the spring 36 and the fluid pressure in the chamber 50 exceeds the pressure of the fluid from the source of supply, communication to the cylinder 15 is closed permitting return of the piston assembly 14 under the action of the spring 25. In this connection, it is to be noted that upon return movement of the piston assembly, the fluid under pressure in the cylinder 15 and in the associated chambers is permitted to exhaust through the passage 62 having one end communicating with the passage 27 and having the other end communicating with an outlet opening 63. It will, of course, be understood that the exhaust opening 63 is so located with respect to the piston 33 as to be closed by the latter when the same is in the position thereof establishing communication through the fluid inlet passage 27, and to be opened by the piston when the latter is in its forwardmost position wherein communication through the passage 27 is closed thereby.

From the above it will be apparent that although the valve assembly 26 is manually operated to effect relative movement of the electrodes into clamping engagement with the work to be welded, nevertheless, it is automatically operated to release the work from between the electrodes after a predetermined time interval elapses. The interval of time the electrodes are maintained into clamping relation to the work is accurately regulated by controlling the period required to build up the pressure in the chamber 50 required to return the valve piston 33 to its inoperative position, and this is accomplished by properly adjusting the measuring valve 53.

Provision is also made in the welding apparatus forming the subject matter of this invention, to automatically control the electric circuit to the electrodes, and this is accomplished by the switch construction featured in Figure 4. Prior to defining the switch construction, it may be pointed out that the switch is closed to establish the circuit to the electrodes in timed relation to relative movement of the electrodes into clamping engagement with the work, and is automatically opened by the fluid pressure in the accumulating chamber to break this circuit after a predetermined interval of weld.

Upon reference to Figure 4, it will be noted that the switch comprises a casing 70 having a stationary contact block 71 secured in the open end of the casing and having a chamber 72 at the rear end of the casing. The contact block 71 is provided with a pair of stationary contacts 73 connected in the circuit to the electrodes by means of the conductors 74, in such a manner that bridging the contacts 73 closes the circuit to the electrodes. In the present instance, the contacts 73 are bridged by a contact member 75 connected to a piston assembly 76 for movement longitudinally of the casing toward and away from the stationary contacts. The piston assembly comprises a sleeve 78 connected at the forward end to the contact member 75 and slidably mounted within a bushing 79 fixed in the casing 70. Extending axially through the sleeve 78 and movable as a unit therewith, is a plunger 80 having an enlargement 81 on the rear end thereof, extending into the chamber 72. The plunger 80 and accordingly the movable contacts 75, are normally urged in a direction away from the stationary contacts 73 by means of a coil spring 82 encircling the plunger in the manner clearly shown in Figure 4. The rear end of the coil spring 82 engages the enlargement 81 while the forward end of the spring abuts a shoulder 83 formed by the outer end of the fixed sleeve 79. The extent of movement of the contacts 72 in a direction away from the stationary contacts is restricted in the present instance by a shoulder 84 formed on the slidable sleeve 78 and engageable with a co-operating shoulder 79' formed on the fixed sleeve 79.

The switch previously described is actuated by fluid pressure and in order to provide for moving the piston assembly in a direction to bridge the stationary contacts 73, communication is established between the chamber 72 and the interior of the cylinder 15 through the medium of the passage 55. As shown in Figure 3, the passage 55 is provided with an extension 85 communicating with the chamber 72 through the medium of a valve controlled port 86. The flow of fluid medium through the port 86 to the chamber 72 is regulated by means of a needle valve 86' similar in construction to the needle valves 53 and 57. Thus, it will be apparent that the interval of closing of the switch, after the port 58 is uncovered by the piston assembly 14, is determined by the adjustment of the needle valve 86'. However, as soon as the fluid pressure in the chamber 72 exceeds the force exerted by the spring 82, the contact member 75 engages the stationary contacts 73 to close the circuit to the electrodes.

As previously stated, fluid pressure is also employed for automatically opening the circuit to the electrodes or, in other words, for moving the contact member 75 in a direction away from the cooperation stationary contacts 73. This is accomplished in the present instance by establishing communication between the space 87 in advance of the piston assembly 77 and the interior of the accumulating chamber 51 through the medium of a passage 88. The arrangement is such that if the pressure of the fluid discharged from the accumulating chamber into the space 87 approaches the pressure of the fluid in the chamber 72, the spring 82 automatically effects the desired movement of the contacts 75 away from the stationary contacts 73 to open the circuit to the electrodes. It necessarily follows, therefore, that the duration of the weld is depended upon the period required to build up sufficient pressure in the space 87 of the switch chamber to open the circuit to the electrodes, and this period is accurately controlled by adjusting the measuring valve 57 to regulate the flow of fluid pressure from the cylinder 15 to the accumulating chamber 51.

*Operation*

Assuming that the electrodes are in their inoperative positions with respect to each other or, in other words, that communication from the source of supply through the passage 27 to the cylinder 15 is closed by the valve assembly 26 as shown in Figure 6, and that it is desired to move the electrodes into clamping engagement with the work, the operator merely swings the trigger 40 in a rearward direction about the pivotal connection 41. The aforesaid movement of the trigger 40 causes the trigger pin 39 to move the piston 33 to its rearwardmost position wherein communication is established through the passage 27. This latter position of the parts is shown in Figure 1 and in this position, communication is also established from the source of fluid supply to the rear side of the trigger pin 39, causing the latter to return to its inoperative or forwardmost position. The fluid under pressure discharged into the cylinder 15 effects a forward movement of the piston assembly 14 to clamp the work between the electrodes 11 and 12. As the electrodes are relatively moved into clamping engagement with the work, the port 58 is uncovered by the piston assembly 14 permitting fluid under pressure to flow from the cylinder 15 to the switch chamber 72 and to the accumulating chamber 51. As the fluid pressure in the switch chamber 72 exceeds the force exerted by the spring 82, the contact 75 is moved toward the stationary contacts 73 to close the circuit to the electrodes. It will, of course, be understood that the adjustment of the measuring valve 86' is so determined as to permit the electrodes to clamp the work therebetween before the switch is operated to close the circuit to the electrodes.

The fluid under pressure in the accumulating chamber 51 is permitted to flow into the space 87 in the switch chamber and after a predetermined interval of time controlled by the measuring valve 57, becomes sufficient to open the switch with the assistance of the spring 82. Also fluid pressure from the accumulating chamber is permitted to flow into the valve chamber 50 at a rate determined by the measuring valve 53, and this fluid pressure is conducted through the passage 59 to the rear side of the piston 33 of the valve assembly 26. When the combined force of the spring 36 acting upon the rear end of the piston 33 and the pressure in the chamber 50 exceeds the fluid pressure flowing through the passage 27, the piston 33 is moved forward to close communication from the source of fluid supply to the cylinder 15, permitting the spring 25 to release the electrodes from the work.

With the above construction, it will be apparent that relative movement of the electrodes to release the work is not dependent upon the opening of the switch but on the other hand, may be so controlled that the electrodes are maintained in clamping engagement with the work after the switch has operated to open the circuit to the electrodes. This feature is important since it offers the possibility of forging the work upon completion of the actual welding operation.

What I claim as my invention is:

1. In electric welding apparatus, an electrode movable into and out of engagement with the work to be welded, a switch for controlling an electric circuit to the electrode, fluid pressure operated means for actuating the switch to close the circuit to the electrode in timed relation to movement of the electrode into engagement with the work, means also operated by fluid pressure for actuating the switch to open the circuit to the electrode in timed relation to closing of the switch by the aforesaid fluid pressure operating means, additional means operated by fluid pressure for effecting movement of the electrode in a direction away from the work, means for regulating the flow of fluid pressure to the switch opening means to control the length of the weld, and regulating means operable independently of the last named means to control the flow of fluid under pressure to the electrode retracting means.

2. In electric welding apparatus, a cylinder communicating with a source of fluid under pressure, a piston in said cylinder, a movable electrode operatively connected to the piston, a valve controlling the flow of fluid under pressure to the cylinder, a switch for controlling an electric circuit to the electrode, fluid pressure means for actuating the switch to close the circuit to the electrode and to open the circuit in timed relation to closing the same, means for closing the valve to permit movement of the piston in a direction to disengage the electrode from the work, means for regulating the flow of fluid under pressure to the switch operating means to control the length of the weld, and means operable independent of said last named means to control the operation of the valve actuating means to close said valve.

3. In electric welding apparatus, a cylinder communicating with a source of fluid under pressure, a piston in the cylinder, a movable electrode operatively connected to the piston, a fluid pressure operated valve controlling the flow of fluid pressure to the cylinder, a switch for controlling an electric circuit to the electrode, fluid pressure means controlled by movement of the piston for actuating the switch to close the circuit to the electrode and to open the circuit in timed relation to closing the latter, fluid pressure means for operating the valve to close communication from the source of supply to the cylinder to permit the piston in the latter to move the electrode away from the work, means for regulating the flow of fluid pressure to the switch actuating means, and means for independently regulating the flow of fluid pressure to said valve actuating means.

4. In electric welding apparatus, a cylinder communicating with a source of fluid supply under pressure, a piston in said cylinder, a movable electrode operatively connected to the piston, means for controlling the flow of fluid under pressure to the cylinder including a valve having a piston movable in one direction to admit fluid under pressure to the cylinder and movable in the opposite direction to close communication to said cylinder, fluid pressure means for moving the valve piston in a direction to close communication to the cylinder to permit movement of the electrode away from the work by the first named piston, means for regulating the flow of fluid pressure to said valve piston for controlling the interval of closing of said valve, a fluid pressure actuated switch for closing an electric circuit to the electrode, fluid pressure means for actuating the switch to open the circuit to the electrode, and means for regulating the interval of operation of said last named means independent of the means aforesaid for regulating the operation of the valve to close communication to the cylinder.

5. In electric welding apparatus, a cylinder communicating with a source of fluid supply under pressure, a piston in said cylinder movable in one direction by the fluid under pressure, an electrode operatively connected to the piston for movement into engagement with the work to be welded upon movement of the piston in the aforesaid direction, means controlling an electric circuit to the electrode including a switch having a contact member movable in one direction to close the circuit to the electrodes and movable in the opposite direction to open said circuit, said switch communicating with the source of fluid supply at the opposite sides of the contact member whereby the latter is moved in both of said directions by fluid under pressure, a metering valve regulating the rate of flow of the fluid pressure to the switch at one side of the contact member to effect closing of the circuit in timed relation to movement of the piston in a direction to engage the electrode with the work, a second metering valve regulating the rate of flow of fluid pressure to the switch at the opposite side of the contact member to effect opening of the circuit in timed relation to the closing of the same, means controlling the flow of fluid under pressure from the source of supply to the cylinder and switch, said last named means including a valve having a valve member movable to one position to admit fluid under pressure to the cylinder and switch and movable to another position by fluid under pressure from said source of supply to close communication to the cylinder and switch, and a third metering valve regulating the rate of flow of fluid under pressure from the source of supply to the valve member to control the interval of operation of the valve to release the fluid pressure acting on said piston.

6. In electric welding apparatus, a cylinder communicating with a source of fluid under pressure, a piston in said cylinder movable in one direction by the fluid under pressure, an electrode operatively connected to the piston for movement into engagement with the work to be welded upon movement of the piston in the aforesaid direction, means controlling the electric circuit to the electrode including a switch having a contact member movable to one position to close the circuit to the electrodes in timed relation to movement of said electrode into engagement with the work and movable to another position to open the circuit to said electrode, said switch communicating with the source of fluid under pressure and the latter acting on the contact member tending to move said member to the second named position thereof to open said circuit, a metering valve regulating the rate of flow of fluid pressure to the switch to effect opening of the circuit in timed relation to the closing of the same, means controlling the flow of fluid under pressure from the source of supply to the cylinder and switch including a valve having a valve member movable to one position to admit fluid under pressure to the cylinder and switch and movable by fluid under pressure from the source of supply to another position to close communication to the cylinder and switch, and a second metering valve regulating the rate of flow of fluid under pressure from the source of supply to the valve member to control the interval the valve operates to close communication between the source of supply and cylinder and switch.

7. In electric welding apparatus, a cylinder communicating with a source of fluid under pressure, a piston in said cylinder movable in one direction by the fluid under pressure, an electrode operatively connected to the piston for movement into engagement with the work upon movement of the piston in the aforesaid direction, means controlling an electric circuit to the electrode including a switch having a contact member movable to one position to close the circuit to the electrodes and movable to another position to open said circuit, said switch communicating with the source of fluid under pressure and the latter acting on the contact member tending to move said member in a direction to open said circuit, a metering valve regulating the rate of flow of fluid pressure to the switch to effect opening of the circuit in timed relation to closing of the same, means controlling the flow of fluid under pressure from the source of supply to the cylinder and switch including a valve having a piston movable in one direction to admit fluid under pressure to the cylinder and switch and movable in the opposite direction to close communication to said cylinder and switch and to exhaust the latter elements, means conducting fluid under pressure from the source of supply to the valve to move the valve piston in the second mentioned direction thereof, and a second metering valve regulating the rate of flow of fluid under pressure from the source of supply to the valve to control the interval the valve piston operates to close communication to the cylinder and switch and to relieve fluid pressure acting on the electrode operating piston.

8. In electric welding apparatus, a cylinder communicating with a source of fluid supply under pressure, a piston in said cylinder movable in one direction by the fluid under pressure, an electrode operatively connected to the piston for movement into engagement with the work upon movement of the piston in the aforesaid direction, means controlling an electric circuit to the electrode including a switch having a contact member movable to one position to close the circuit to the electrode and movable to another position to open the circuit, means controlling the flow of fluid under pressure from the source of supply to the cylinder including a valve having a valve member movable to one position to admit fluid under pressure to the cylinder and movable to another position to close communication to the cylinder and to exhaust the latter, an accumulating chamber communicating with the source of fluid under pressure and also communicating with the valve and switch to respectively move the contact member of the switch in a direction to open the circuit to the electrode and to move the valve member of the valve in a direction to close communication to the cylinder, means for regulating the rate of flow of fluid under pressure from the accumulating chamber to the switch, and means independent of said last named means for regulating the rate of flow of fluid under pressure to the valve.

HENRY THOMAS PLATZ.